United States Patent [19]

White

[11] Patent Number: 4,933,015

[45] Date of Patent: Jun. 12, 1990

[54] METHOD OF CLEANING TYPE ELEMENTS AND PRINT HEADS

[75] Inventor: Arthur C. White, San Francisco, Calif.

[73] Assignee: Charles D. Knapp, Carriere, Miss.

[21] Appl. No.: 34,088

[22] Filed: Apr. 2, 1987

[51] Int. Cl.$^5$ ............................................... B08B 1/00
[52] U.S. Cl. ..................... 134/6; 15/104.94; 15/209 R; 15/210 R; 15/244.1
[58] Field of Search ............ 15/104.94, 210 R, 209 R, 15/244 R, 244 C, 214, 218.1, 220 R, 244.3; 401/130; 134/6

[56] References Cited

U.S. PATENT DOCUMENTS

| | | | |
|---|---|---|---|
| 3,299,464 | 1/1967 | O'Brien et al. | 401/130 |
| 3,821,829 | 7/1974 | Finnerty | 15/210 R |
| 4,479,136 | 10/1984 | Lewis et al. | 15/104.94 |
| 4,499,627 | 2/1985 | Gruns | 15/210 R |
| 4,558,482 | 12/1985 | Neuman et al. | 15/97 R |

FOREIGN PATENT DOCUMENTS

| | | |
|---|---|---|
| 3442677 | 5/1986 | Fed. Rep. of Germany . |
| 780443 | 7/1957 | United Kingdom ............... 15/244.1 |

Primary Examiner—Edward L. Roberts
Attorney, Agent, or Firm—Thomas S. Keaty

[57] ABSTRACT

A small, simple device for cleaning type elements and print heads consisting of (1) a rigid, yet flexible, plastic backing, onto which is bonded (2) a soft absorbent material which has been wetted with (3) a solvent cleaning solution.

4 Claims, 1 Drawing Sheet

METHOD OF CLEANING TYPE ELEMENTS AND PRINT HEADS

BACKGROUND OF THE INVENTION

1. Field of the Invention

The present invention relates generally to print element cleaning devices and specifically to a device for cleaning type elements and print heads.

2. Background of the Invention

Print elements require periodic cleaning to insure that the elements consistently produce sharp and clear characters. This is true whether the print element is a "type" element such as those used in typewriters and daisy wheel printers, a "matrix" element such as those used in dot matrix printers, or an "ink jet". element such as those used in ink jet printers.

Traditional type elements can be cleaned manually by soaking the element in a cleaning solution, and then rubbing or scrubbing them with a cloth or a brush. Alternatively, when the type elements are not removed for the cleaning process, they can be cleaned with a cleaning putty, or can be rubbed or scrubbed with a cloth or brush soaked with solvent. While such methods do clean the type elements, all are messy and therefore inconvenient to use. An alternative to these manual methods is shown in U.S. Pat. No. 4,558,482 issued Dec. 17, 1985 to Neuman, et al. which discloses a type element cleaner consisting of a moistened fabric pad supported in a container having a cover configured to engage a type element. When the cover is fastened to the container, the fabric pad and type element are brought into contact. Rotation of the type element against the surface of the moistened fabric pad removes dirt and ink from the type element.

Unlike traditional type element devices, such as those used in typewriters and daisy wheel printers, the so-called dot matrix printers create characters by means of steel pins which are arranged in tight vertical rows on the matrix print head. In response to specific dot matrix commands, various combinations of pin heads are made to project outwardly thereby creating specific characters which are printed on paper as the pin heads strike a typewriter-type ribbon. The ink jet printers use neither pins nor ribbons since they create characters by squirting small jets of ink onto the paper.

Not all of the ink in an ink jet printer ends up in the paper; some ends up on the print head and eventually must be cleaned off. The same is true of the dot matrix print head. In that case, the pin heads get dirty from the ink on the typewriter ribbon and so they too must periodically be cleaned. Unfortunately many prior art cleaning methods require removal of the ink jet or dot matrix print head prior to cleaning. Despite the claims of modern manufacturers that print heads can be assembled easily and rapidly, the print head removal requirement usually means that a technically trained professional will have to be involved in the cleaning process. The need for professional help when cleaning the print head is not only costly but may also mean the print heads are not cleaned as often as they should be.

A number of different systems have been developed to clean ink jet and matrix print heads. For example, U.S. Pat. No. 4,479,136 issued Oct. 23, 1984 to Lewis, et al. discloses a cleaning system for use on ink jet printers. The Lewis system consists of a cleaning card and a card guide device. When the person using the cleaning system inserts the cleaning card between the card guide and the print head, the card guide device positions the front face of the cleaning eard, so that as the card is pushed down by the user it comes in contact with the ink jet print head. The Lewis cleaning card has a foam strip secured along the bottom of its front face. Prior to use the foam strip is saturated with cleaning solvent. When the cleaning card is inserted between the card guide and the print head, the foam strip is squeezed, thereby releasing the solvent to clean the print head. Movement of the cleaning card wipes the face of the print head with the sponge, thereby cleaning it.

German Patent Application No. DE 34 42 677 Al, filed Nov. 23, 1984 by Winfried Labuda, discloses a cleaning paper for matrix print heads. The Labuda paper is the width of standard continuous feed printer paper, and like continuous feed paper, has marginal perforations which are engaged by the printer's paper feed gear mechanism. Unlike conventional printer paper, the Labuda cleaning paper is composed of a hard, flexible, alcohol resistant layer and a soft, absorbent cleaning material layer. The hard, alcohol resistant layer has a recess in it which resembles a window; the soft, absorbent cleaning material covers the window. According to the teaching of the Labuda application, using only the paper drive mechanism of the printer whose print head is to be cleaned, the cleaning paper can be positioned so that, once the ribbon is removed, the print head can "print" onto the cleaning paper. Part of the cleaning paper will have been saturated with a cleaning solvent so that, as the various characters are created, sometimes the pin heads will come in contact with solvent soaked paper. At other times the pin heads will touch dry paper which will tend to absorb the ink and grime dissolved by the solvent, thus cleaning the print head.

Devices such as those disclosed by Neuman, Lewis and Labuda are useful when there is time for the printer to "go down" to be cleaned and there is money to purchase the mechanical cleaning devices. Sometimes however, it is not possible or convenient to "shut down the presses" and give the type elements or print heads a good cleaning. Such is the case if the print quality begins to deteriorate in the midst of a big printing task, or in the midst of printing a specific document. At times like this a user does not want to stop and turn off the printer, thus losing the printing parameters. The user also does not want to remove the paper and the ribbon cartridge and bypass the "cartridge-in-place" sensor switch before being able to clean the print head. Instead the user wants to momentarily halt the printing or typing process and then quickly and easily clean the type element or the print head. Thus there is a need for a simple cleaning device that can be used by untrained personnel even in the midst of a big typing or printing task. Such a device should be simple to use, inexpensive to purchase, and not require that the typewriter or printer be shut down or dismantled in order to clean the type element or print head.

SUMMARY OF THE INVENTION

The present invention discloses a simple cleaning device which can be used without shutting down the printer or dismantling the print head, even by people who are not technically trained to clean type elements or print heads. The cleaning device of the invention is comprised of three parts: (1) a hard, flexible, solvent impervious backing means, (2) a soft absorbent means, which is bonded to the backing means, and which is wetted with a (3) cleaning solvent means. To clean a type element or a print head with the cleaning device, the operator wipes or gently scrubs the face of the type element or print head with the solvent wetted absorbent portion of the cleaning device. As a result of the rubbing or wiping action of the absorbent means and the cleansing properties of the cleaning solvent, dissolved ink and loosened grime are transferred from the type element or print head to the absorbent portion of the cleaning device, thus cleaning the type element or print head. Various embodiments of the cleaning device are shown in the drawings, which are summarized as follows:

DRAWINGS

DESCRIPTION OF THE PREFERRED EMBODIMENT

Figure 1:
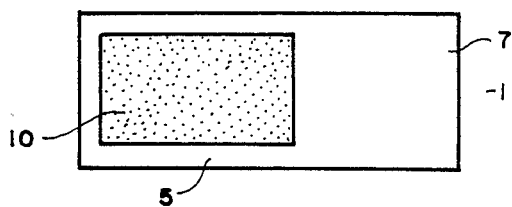
FIG. 1 is a front-plan view of the cleaning device for a preferred embodiment of the present invention.
Figure 2:
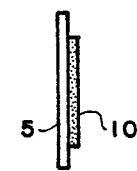
FIG. 2 is a side-plan view of the cleaning device for a preferred embodiment of the present invention.

A preferred embodiment of the present invention is shown in FIGS. 1 and 2. Other embodiments are shown in FIGS. 3 through 6. In discussing the embodiments and the figures, the numeral reference designations shown in the drawings will be used.

With reference to FIG. 1, the cleaning device 1 is shown in a preferred rectangular shape, having sides which are shorter than the top and bottom edges. Cleaning device 1 is comprised of backing means 5 and absorbent means 10. In this preferred form, absorbent means 10 is also rectangular in shape, but smaller in size than is backing means 5. Absorbent means 10 is bonded to backing means 5 by any suitable means. In this preferred form the bonded absorbent means is not centered on the backing means but instead is positioned at one end of the rectangular strip. In this form a small border of backing means surrounds the absorbent means on three sides. On the fourth side the backing means comprises the remaining portion of the rectangular strip, thereby creating a "tab" 7 by which the cleaning device can be gripped when being used to clean the type element or print head. In FIG. 2, absorbent means 10 is shown bonded to and protruding slightly from the front face of backing means 5.

Figure 3:
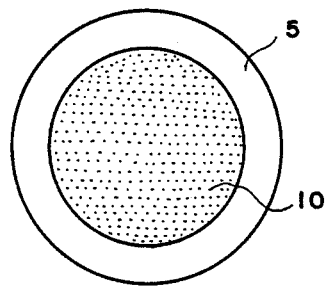
FIG. 3 is a front-view of a second embodiment of the cleaning device of the present invention.

FIG. 3 shows the backing means in the shape of a disk, with the absorbent means also being disk-shaped, but slightly smaller than the backing means disk. The absorbent means disk is bonded to the backing means disk so a small border of backing means surrounds the absorbent means on all sides.

Figure 4:
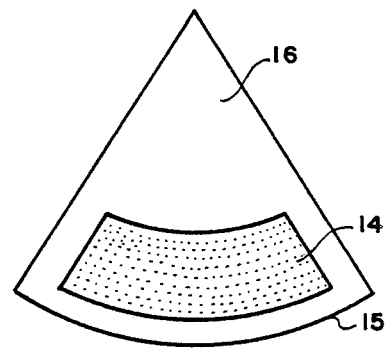
FIG. 4 is a front-view of a third embodiment of the cleaning device of the present invention.

FIG. 4 shows the backing means in a triangular or pie piece shape, with the absorbent means being bonded as arced strip 14 along the arced outer edge 15. This leaves the pointed apex area 16 free of cleaning solvent, and thus dry and easy to grip when using the device for cleaning.

Figure 5:
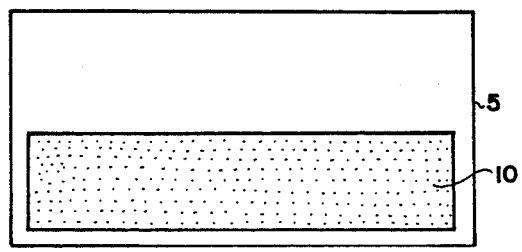
FIG. 5 is a front-view of a fourth embodiment of the cleaning device of the present invention.
Figure 6:
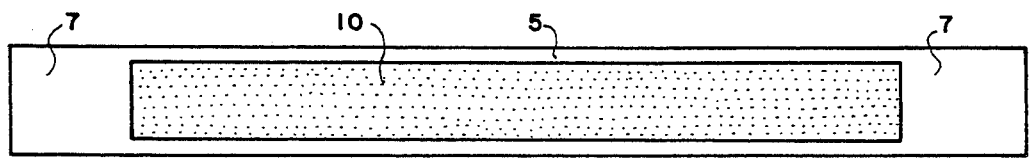
FIG. 6 is a front-view of a fifth embodiment of the cleaning device of the present invention.

FIG. 5 shows the cleaning device as a "tall" rectangle with absorbent means 10 being positioned along the bottom edge. This creates a solvent-free tab like gripping area across the top of the rectangle. FIG. 6 shows the cleaning device as a ribbon.

According to the invention, backing means 5 can be any material that is relatively rigid, yet still slightly flexible, as long as the material is impervious to the solvent means used to dissolve the ink and grime from the type element or print head. In the preferred form, the backing means is a thin strip or piece of rigid yet flexible plastic. As illustrated in the Figures, the backing means can be any suitable shape and size. In the preferred forms, the backing means is about 1/64 inches to about 1/32 inches thick. When rectangular in shape, the device is preferably about ⅜ inches to about 1 inch wide, and about 2 inches to about 2½ inches long.

Absorbent means 10 can also be any suitable material as long as the material is relatively lint free, capable of absorbing the cleaning solvent plus dissolved ink and grime, and is capable of being bonded to backing means 5. Absorbent material such as cotton cloth, woven paper fiber or sponge are all suitable as absorbent means for use in the present invention. Woven cotton or synthetic fiber or dense sponge is especially preferred. Although the absorbent means can be the same size as the backing means, as discussed above, the absorbent means is preferably smaller than the backing means and when bonded to the backing means, is positioned so that a small border of backing means In that manner, a border is formed between the absorbent material and an outer periphery of the backing means. This small border of backing means helps to contain the cleaning solvent within the area of the absorbent means, thus making the device less messy to use. Absorbent means 10 is preferably about 3 mil to about 6 mil thick. In the preferred rectangular form, absorbent means 10 is about ⅜ inches to about ⅝ inches wide, and about 1 to about 1½ inches long.

Absorbent means 10 can be bonded to backing means 5 by any suitable bonding process, including but not limited to ultrasonic bonding, thermal bonding, chemical bonding, bonding with adhesives, etc.

According to the invention the cleaning solvent can be any solvent which dissolves printing ink and grime from the type element or print head. Suitable solvents include but are not limited to ethyl alcohol and isopropanol. Other suitable solvents can be determined by those skilled in the art, without undue experimentation, depending upon the particular ink used to ink the printer or typewriter ribbon. The soft absorbent means can be pre-wetted with an appropriate cleaning solvent at the time the device is manufactured, or the solvent can be applied to the absorbent means by the operator just prior to the cleaning operation. When the absorbent means is pre-wetted with cleaning solvent at the time of manufacture, the cleaning device is preferably packaged in a sealed package, such as a plastic or foil envelope. In this pre-wetted form the cleaning device is ready to use once the protective envelope is removed. Alternatively, the cleaning device can be packaged without having the absorbent means pre-wetted with cleaning solvent. In that case, the operator wets the absorbent means with cleaning solvent prior to use. Cleaning solvent can be supplied for this purpose in any suitable manner, including a dropper bottle, spray can, pump bottle, or pre-measured popable bubbles.

In the operation of the present invention, the printer can be temporarily paused, thus retaining the printing parameters and control instructions. To clean a type element or print head the backing means is gripped by the operator and then the face of the type element or the print head is wiped or gently scrubbed with the solvent wetted absorbent means portion of the cleaning device. With printers having ribbons, the cleaning device can be inserted between the ribbon and the print head or type element, thus avoiding the necessity of removing the ribbon cartridge. As a result of the rubbing or wiping action of the absorbent means and the cleansing properties of the cleaning solvent, dissolved ink and loosened grime are absorbed by the absorbent means, thereby cleaning the face of the type element or the print head.

Thus it can be seen that the present invention discloses a simple cleaning device which can be used by untrained operators to clean type elements and print heads. The present disclosure discloses several embodiments of the cleaning device. These embodiments are meant to be illustrative, not restrictive. The scope of the invention is indicated by the appended claims, not by the foregoing description and drawings. All changes which come within the meaning and range of equivalency of the claims are therefore intended to be embraced therein.

What is claimed is:

1. A method of cleaning type elements and print head; comprising the steps of:
   providing a solvent impervious backing means having a portion adapted for manual gripping during the cleaning process and an absorbent means fixedly attached to said backing means, providing a border between said absorbent means and an outer periphery of the backing means to prevent a solvent cleaning solution from spreading beyond the outer periphery of the backing means;
   manually gripping said griping portion of the backing means;
   positioning the device between the printing ribbon and the print head or type element while retaining a grip on the gripping means; and,
   wiping said type elements and print heads by contacting said type elements and print heads with said absorbent means.

2. The method of claim 1, wherein at least a part of said solvent imperious backing means forms the gripping portion of the device.

3. The method of claim 1, wherein said absorbent means is wetted with a solvent cleaning means prior to wiping said type elements and print heads.

4. The method of claim 1, wherein said type elements and print heads are wiped with said absorbent means after said device has been positioned between a printing ribbon and the print head or type element.

* * * * *